Figure 1:
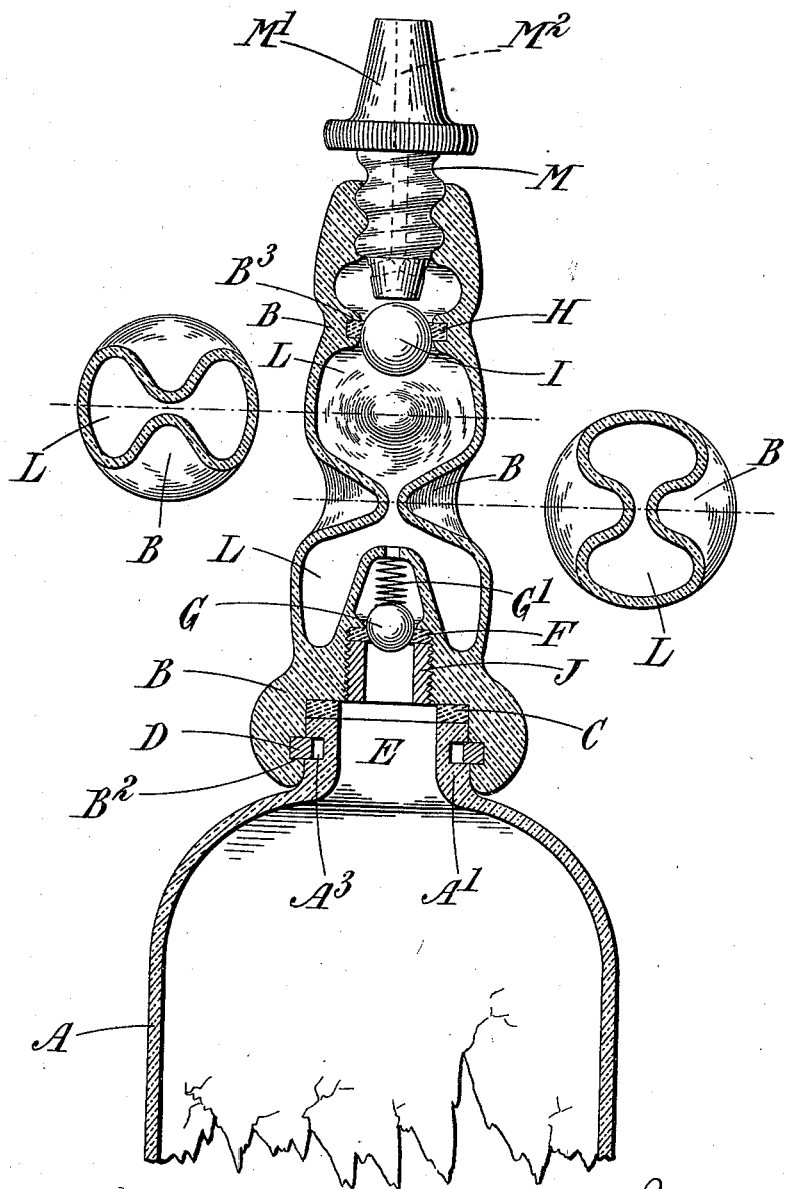

A. R. EDWARDS.
NON-REFILLABLE BOTTLE OR THE LIKE.
APPLICATION FILED MAR. 7, 1911.

1,001,744.

Patented Aug. 29, 1911.

3 SHEETS—SHEET 1.

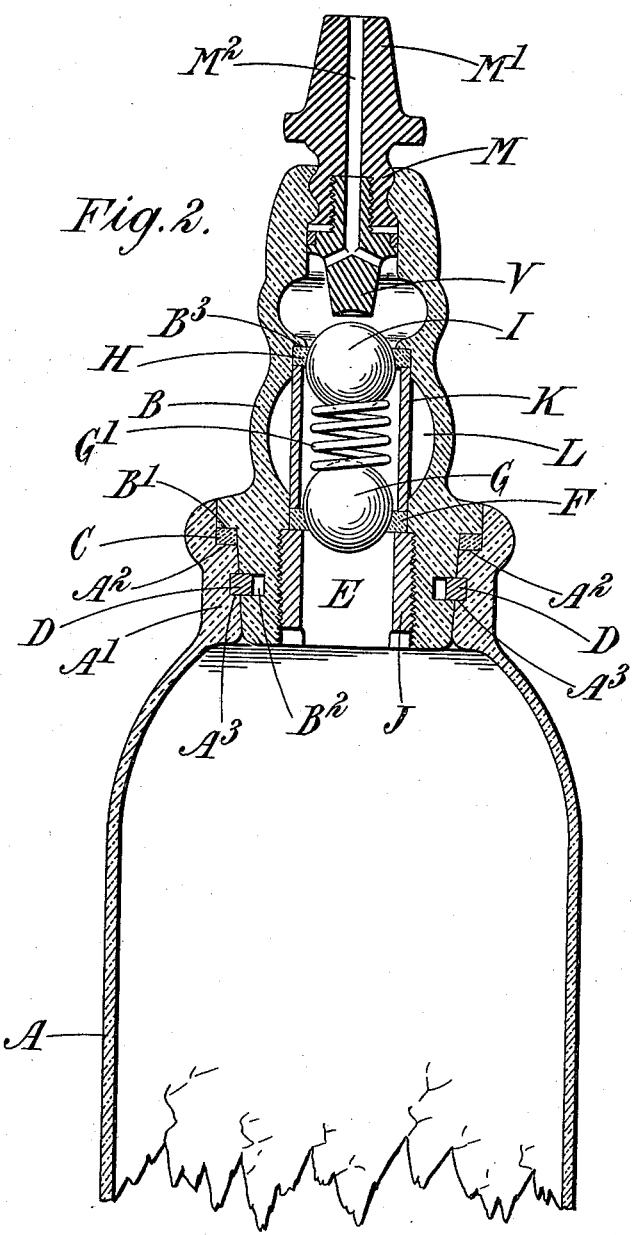

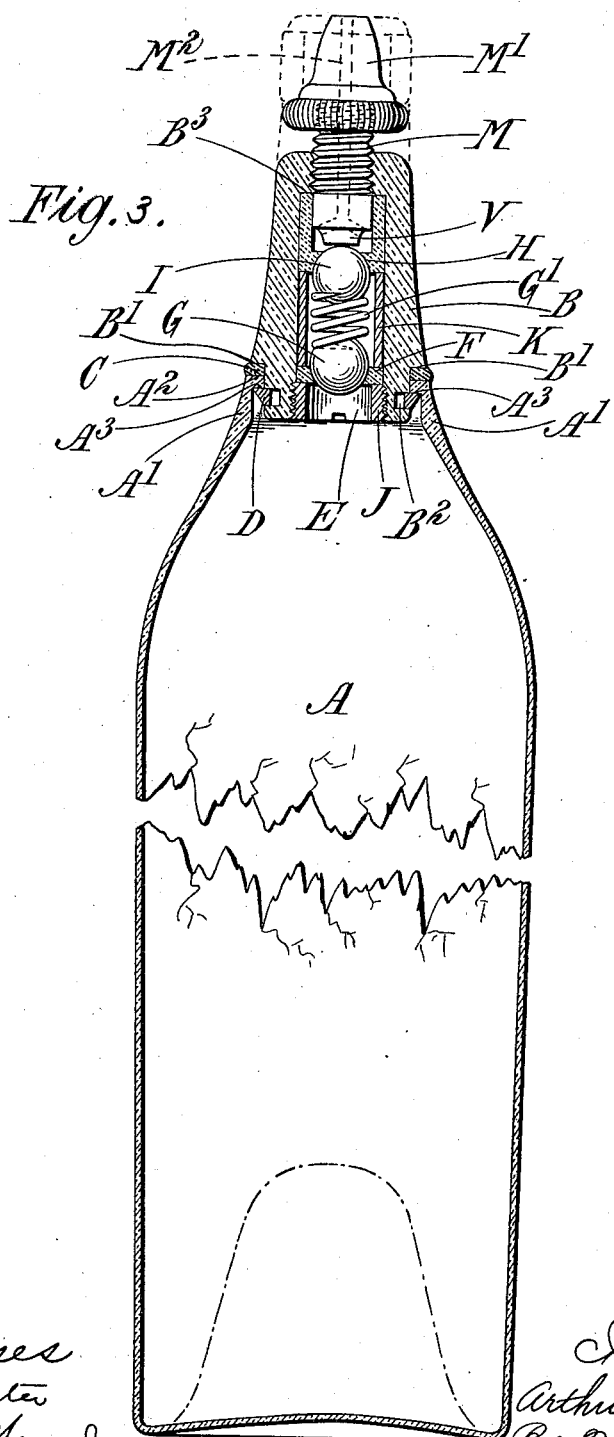

UNITED STATES PATENT OFFICE.

ARTHUR RICHARD EDWARDS, OF CANTON, COUNTY OF GLAMORGAN, ENGLAND.

NON-REFILLABLE BOTTLE OR THE LIKE.

1,001,744.  Specification of Letters Patent.  Patented Aug. 29, 1911.

Application filed March 7, 1911. Serial No. 612,741.

*To all whom it may concern:*

Be it known that I, ARTHUR RICHARD EDWARDS, a subject of the King of England, residing at Canton, county of Glamorgan, Wales, England, have invented certain new and useful Improvements in Non-Refillable Bottles or the Like, of which the following is a specification.

This invention relates to bottles or the like so constructed that they cannot be refilled and after the contents have been extracted the bottle must be broken. The neck or stopper of the bottle is a separate piece from the bottle or vessel itself and may be made of different material.

The invention will be best understood by reference to the accompanying drawings in which—

Figures 1 and 2 are longitudinal sections through bottles constructed according to this invention. On each side of Fig. 1 is a cross-section of the stopper on its respective section line. Fig. 3 shows a slight modification from Fig. 2 to suit bottles of standard size and shape.

Like letters represent like parts in all figures.

The bottle or vessel A, Fig. 2, is made with a short neck A' of relatively large diameter and preferably slightly tapered inside as shown and provided with a shoulder $A^2$ to receive a rubber or equivalent packing ring C and an annular groove $A^3$.

The stopper B which takes the place of the neck of an ordinary bottle may be of glass, metal, vulcanite or other suitable material made with one end of appropriate size and shape to fit the open end or socket A' of the bottle as previously described; it has an external shoulder B' between which and the internal shoulder $A^2$ in the bottle the rubber packing ring C is compressed and it has an external groove to match the previously mentioned internal groove $A^3$ in the bottle neck, into which cement or other appropriate material D which can be applied in the liquid form and then set, may be inserted through a hole in the bottle neck or a spring wire or other suitable washer may be used here.

The stopper has at its lower end a central bore E with an internal annular groove to receive a rubber or equivalent washer F upon which rests a ball G pressed by a helical spring $G^1$ upon the washer—this ball forms a valve and opens outwardly. The valve chamber opens into an enlarged space L beyond it in the stopper, at the upper or outer end of which another internal groove carries another rubber or equivalent ring H upon which rests a ball valve I Fig. 2 opening inwardly also retained upon its seat by the spring $G^1$. Between the two valves in Fig. 1 the stopper is pressed inward at one or more places to prevent the outer valve from falling too far from its seating and to form baffles to prevent tampering as with a wire for instance. In Fig. 2 the grooves to hold the rubber seatings F and H are formed by spaces between the nipple J screwing into the stopper B and the sleeve K lying in the enlargement L the nipple when screwed home forcing ring F against sleeve K, and sleeve K forcing ring H against shoulder $B^3$ of stopper B whereby all the parts J, F, K and H are securely held in their respective places. This is a convenient way of doing this, although the rubber rings, F and H, could be sprung into fixed grooves if necessary as at H in Fig. 1.

The open end of the stopper is screw-threaded to receive a screwed stopper M of vulcanite or other appropriate material such as is commonly used in beer and other bottles, but the stopper extends at M' beyond the milled head and is perforated through its length, as shown in dotted lines at $M^2$, the perforation preferably branching at the inner end so that by screwing the stopper inward the ball valve I can be forced off its seat, and the spring G' being weak the gas pressure in the bottle forces the valve G off its seat, and the contents of the bottle being under pressure, can be withdrawn through the opening in the stopper.

It will be seen that any attempt to refill the bottle through the stopper will merely result in pressing the valve G more firmly upon its seat, so preventing the liquid from passing into the bottle.

After the contents have been withdrawn, the bottle must be broken to release the stopper, which can then be used for another bottle.

Where hard ball valves and soft seatings have been mentioned, soft valves with hard or soft seatings, or hard valves and seatings may be substituted, or valves of a different type—mushroom for instance—may be used.

Thus bottle stopper and valves and seats may all be of glass or the like if desired.

The contents of the bottle can easily be withdrawn when required by screwing inward the stopper M which forces the valve I off its seat allowing the liquid under pressure to escape through the perforation $M^2$, as previously explained; when sufficient liquid has been drawn off the stopper M may be unscrewed, thereby allowing the valve I to return to its seat and hermetically close the opening, leaving the remaining contents of the bottle for future use. Of course the whole of the contents can be withdrawn at once if desired.

The stopper M is in two pieces, the head V being screwed in as shown in Fig. 2 after the stopper has been placed in position in the bottle neck B. The part V is applied and screwed in from the inside of the neck B and is provided with any necessary washers or packing to make it gas-tight.

In the modification shown in Fig. 3 the operation is the same and the construction substantially the same as in Fig. 2, with the exception of the valve seating H which is of the shape shown providing a seating for the ball valve I and bored cylindrically at its upper end to receive the end of the screwed stopper M which is also cylindrical and a close fit in H to prevent leakage when the contents of the bottle are being withdrawn. H may be made of cork, rubber or the like.

The receptacle may be arranged to hold more than one bottle if preferred.

What I claim as my invention and desire to secure by Letters Patent is:—

1. The combination with a bottle, of a separate neck, oppositely-opening upper and lower valves arranged within said neck, a spring bearing upon the lower valve and operating to normally close it, and a stopper provided with a passage communicating with the interior of the neck, said stopper screwing within the neck and operating to bear upon the upper valve to effect the opening thereof.

2. The combination with a bottle, of a separate neck, oppositely-opening valves arranged within the neck, a spring bearing upon the lower valve and operating to normally close it, a stopper provided with a passage communicating with the interior of the neck, said stopper screwing within the neck and operating to bear upon the upper valve to effect the opening thereof, and a plurality of baffles integral with the neck and located intermediate the valves.

In testimony whereof I have signed my name to this specification in the presence of two subscribing witnesses.

ARTHUR RICHARD EDWARDS.

Witnesses:
  A. J. LOVELL,
  ALFRED SHANKLAND.